(12) United States Patent
Mohammadkhani et al.

(10) Patent No.: US 12,338,345 B2
(45) Date of Patent: Jun. 24, 2025

(54) METHOD FOR PRODUCING ACRYLIC SOLID SURFACE WITH IMPROVED COLOR AND SCRATCH APPEARANCE

(71) Applicant: Trinseo Europe GmbH, Pfaeffikon (CH)

(72) Inventors: Mohammad Mohammadkhani, Florence, KY (US); Roger Neil Caldwell, Erlanger, KY (US); Sebastian Joseph, Mason, OH (US)

(73) Assignee: TRINSEO EUROPE GMBH, Pfaeffikon (CH)

( * ) Notice: Subject to any disclaimer, the term of this patent is extended or adjusted under 35 U.S.C. 154(b) by 0 days.

(21) Appl. No.: 17/060,341

(22) Filed: Oct. 1, 2020

(65) Prior Publication Data
US 2021/0102057 A1 Apr. 8, 2021

Related U.S. Application Data

(60) Provisional application No. 62/909,312, filed on Oct. 2, 2019.

(51) Int. Cl.
*C08L 33/08* (2006.01)

(52) U.S. Cl.
CPC ......... *C08L 33/08* (2013.01); *C08L 2205/025* (2013.01)

(58) Field of Classification Search
CPC ..................................................... C08L 33/08
See application file for complete search history.

(56) References Cited

U.S. PATENT DOCUMENTS

| 4,221,697 | A | 9/1980 | Osborn et al. |
| 4,413,089 | A | 11/1983 | Gavin et al. |
| 5,530,041 | A | 6/1996 | Minghetti et al. |
| 6,077,575 | A | 6/2000 | Minghetti |
| 2015/0166739 | A1 | 6/2015 | Rose et al. |

FOREIGN PATENT DOCUMENTS

EP 0393129 A1 10/1990

OTHER PUBLICATIONS

International Search Report and Written Opinion, PCT/US2020/053680. Applicant: Aristech Surfaces LLC. Date of mailing—Dec. 22, 2020. 15 pages.
Safety Data Sheet No. C60111; Product Name: Acrylic Syrup; MSDS Issue Date May 1, 1990; SDS Revision Date: Jan. 19, 2014; Aristech Surfaces LLC; 13 pages.

*Primary Examiner* — Wenwen Cai
(74) *Attorney, Agent, or Firm* — Buchanan Ingersoll & Rooney PC

(57) ABSTRACT

This technology is directed to a well-dispersed micronized pigment (carbon black and/or metal oxides such as iron oxide and zinc sulfide) which is added to Aristech's acrylic solid surface formulation at 0.5-5 wt % resulting in a solid surface with an enriched color and improved surface scratch appearance. The use of the micronized pigments helps surface scratches appear less white because of the improved coverage of white aluminum trihydrate (ATH).

11 Claims, 2 Drawing Sheets ized pigments covers the surface of an aluminum trihydrate (ATH) filler with very small, well-dispersed, pigment particles which helps to cover/hide the white color of ATH and may provide a unique, enriched color appearance to the solid surface. The use of the micronized pigments may also help surface scratches appear less white because of the improved coverage of white ATH.

METHOD FOR PRODUCING ACRYLIC SOLID SURFACE WITH IMPROVED COLOR AND SCRATCH APPEARANCE

PRIORITY

This application claims priority to U.S. Provisional Patent Application No. 62/909,312, entitled "METHOD FOR PRODUCING ACRYLIC SOLID SURFACE WITH IMPROVED COLOR AND SCRATCH APPEARANCE," filed Oct. 2, 2019, the disclosure of which is incorporated by reference herein.

BACKGROUND

In general, colored, hued, tinted, shaded, and/or patterned polymeric materials ("colored plastics") are desirable for use in a variety of applications, such as consumer products and polymeric/composite building materials. Such colored plastics provide improved appearance and aesthetic character to the objects into which they are formed. Typically, pigments, including micronized pigments, or dyes may be added to the polymeric materials to produce a colored plastic product for a variety of industrial, commercial and residential uses.

However, traditional colored polymeric materials can fade, lose color, or undergo aesthetically displeasing color changes. Traditional dyes may leach from the polymeric material or may lose color or bleach through thermal degradation or degradation caused by exposure to radiation, such as ultraviolet electromagnetic radiation, photobleaching from sunlight and the like. Leaching is a particular problem for dyes and pigments blended in halogenated polyolefins. As such, polymer materials including such dyes and pigments may have poor color fastness.

In addition, uniform dispersion of traditional pigments and dyes within polymeric material may be difficult. Poor dispersion leads to swirling and color variability within the colored polymeric material. Further, poor dispersion of the dyes and pigments within the plastic article may lead to undesirable mechanical properties. As such, compatibilizers are typically used to disperse dyes and pigments within a polymeric material. Such compatibilizers include a variety of organic compounds that aid in dispersing the dye or pigment. In addition, dyes, pigments and micronized pigments may be dispersed using high shear mechanical processes. However, compatibilizers typically are expensive and may also adversely affect mechanical properties of the colored polymeric material. Pigmentation of mineral filled polymers may even be more challenging since one has to address the inherent whitening of the polymeric material with inorganic fillers such as calcium carbonate, talc, alumina trihydrate etc.

Accordingly, there is a continued need within the industry to provide colored plastics having improved fastness, stability and resistance to bleaching and color leaching.

BRIEF SUMMARY

A dispersed micronized pigment (for instance carbon black and/or metal oxides such as iron oxide and zinc sulfide) such as 11B3323 from Penn Color may be added to Aristech's polymeric (for instance, acrylic) solid surface composition at about 0.5-5 wt %, resulting in a solid surface acrylic composition having an enriched color and improved surface scratch appearance. Other pigments may include 11R3335 (60% Red iron oxide); 11Y3336 (45% yellow iron oxide); 11W3338, 55% zinc sulfide white. The addition of the micronized pigments covers the surface of an aluminum trihydrate (ATH) filler with very small, well-dispersed, pigment particles which helps to cover/hide the white color of ATH and may provide a unique, enriched color appearance to the solid surface. The use of the micronized pigments may also help surface scratches appear less white because of the improved coverage of white ATH.

DETAILED DESCRIPTION

This technology is directed to a dispersed micronized pigment (for instance, carbon black and metal oxides, including but not limited to iron oxide and zinc sulfide) such as 11B3323 from Penn Color, which may be added to Aristech's acrylic solid surface formulation at about 0.5-5 wt %, or about 0.5-2.5 wt %, or 0.5-1 wt %, resulting in a solid surface with an enriched color and improved surface scratch appearance. A micronized carbon black pigment may also be dispersed in a liquid carrier such as a benzoate ester, butyl acrylate, methyl methacrylate or n-butyl methacrylate to provide better coloration to the polymeric material.

In one embodiment, the polymeric material, which may be an acrylic polymer, includes a pigment dispersed in the filler reinforced polymer matrix. The pigment is bonded to the surface of the reinforcing filler through intermolecular forces such as hydrogen bonding to the surface of the reinforcing filler. Such fillers may include alumina hydrate particulate.

In general, the acrylic solid surface of the polymeric material includes alumina trihydrate (ATH) (CAS No. 21645-51-2, also referred to as aluminum hydroxide or aluminum trihydroxide) having the formula: $Al(OH)_3$. In a particular embodiment, the alumina hydrate particulate material is free of non-alumina ceramic materials, and, in particular, is free of silica and aluminosilicate materials. Note that products such as Onyx Elite 339 or Onyx Elite 300 may be used as the ATH. Onyx Elite 339 is comprised of spherical particles with an average diameter of 16 microns. The water content in the molecular structure of ATH is 35%. It is particularly advantageous to use ATH that has been chemically treated with a coupling agent. Coupling agents can include methacryloxy silanes such as 3-methacryloxy-propyl trimethoxy silane or proprietary coupling agents from BYK such as C8002.

The dispersed micronized pigment covers the surface of alumina trihydrate (ATH) filler with very small, well-dispersed, micronized pigment particles which helps cover the white color of ATH and gives a unique, enriched color appearance to the solid surface. It also helps cosmetically with any surface scratches to appear less white because of the improved coverage of white ATH. A typical composition of the subject invention comprises the following, to which is added about 1.27 wt % of micronized carbon black pigment.

Figure 1:
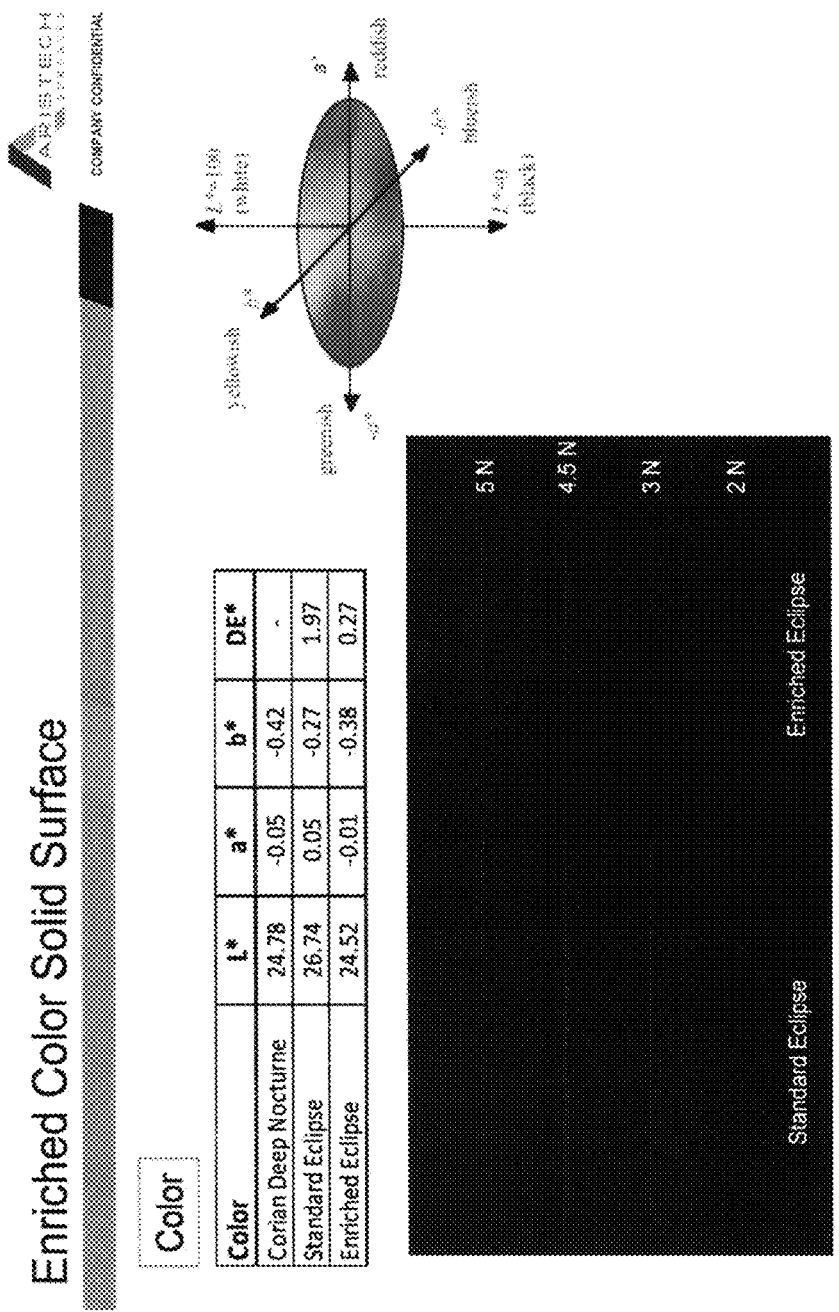
FIG. 1. Scratch visibility for enriched color solid surface.
Figure 2:
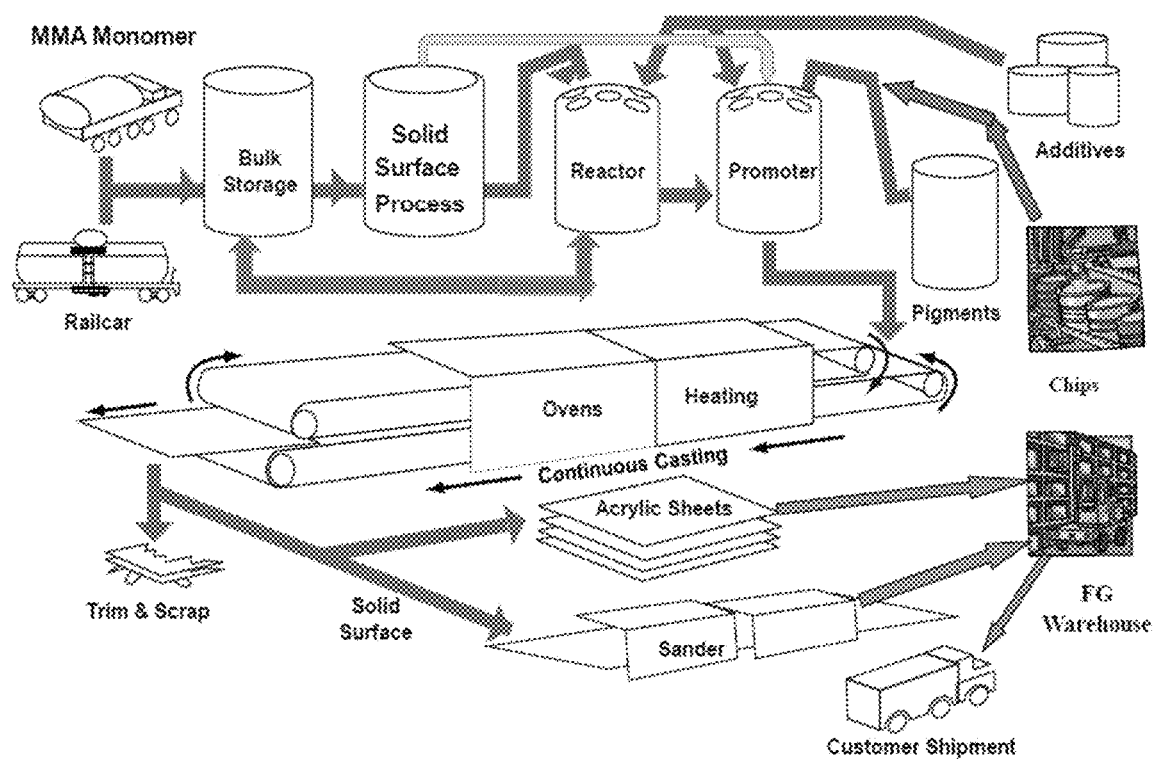
FIG. 2. Manufacturing process steps for an acrylic solid surface.

Example 1 of a typical production process. See FIG. 2. This process is in no way meant to be limiting, but merely serves as an illustrative example as to how the polymeric material may be formed.

Chemicals Used in Example 1 Process

| | |
|---|---|
| SSI - Acrylic pre-polymerized syrup at 20% solids | 20-35% |
| MMA - methyl methacrylate | 5-20% |
| BYK1142-Wetting/dispersing agent from BYK | 0.0-0.5% |
| ATH-Silane ATH | 5-70% |
| Triisooctyl phosphate - Anti flocculating agent | 0.1-0.8% |
| Pigment - Carbon black | 0.5-5.0% |
| n-dodecyl mercaptan - Chain transfer agent | 0.005-0.02% |
| Zelec UN and Zelec NE-Phosphate ester-Release agent | 0.05-0.1% |
| ethylene glycol dimethacrylate - Crosslinking agent | 0.1-1.0% |
| t-butyl peroxypivalate - Initiator | 0.0-0.03% |
| t-butyl peroxyneodecanoate - Initiator | 0.0-0.05% |
| t-amyl peroxy-2-ethyl-hexanoate - Initiator | 0.0-0.02 |
| Acrylic/Acrylic solid surface/Polyester/Polycarbonate chips | 5 to 30% |

The Silo Process:
1) SSI, MMA, BYK1142, and Silane ATH are metered and mixed in the silo room mix tank for 15 minutes at 3 amps to form a dispersion.
2) The dispersion is sent to the storage tank. It continues to mix and is recirculated until it is needed for further processing.
3) The dispersion is then filtered into a promoter using a 250 to 400 micron filter. It mixes at 60-90 rpms in the promoter until it is needed for further processing.

The Promoter Process:
4) The composition from step 3 has the following chemicals next added, mixing at 60-90 rpms: the chemicals comprise (1) n-dodecyl mercaptan; (2) ethylene glycol; (3) dimethacrylate; (4) Zelec NE, and (5) MMA are subsequently transferred; followed by (6) Triisooctyl phosphate and (7) additional MMA which are transferred.
5) 150 pounds of SSI is added to a large pot, then pigment is added, and mixed at high shear for 20 minutes. It is then transferred into the mixing vessel using a polytube, for instance, a 4-inch polytube.
   a. If any precipitated silica such as Neosil or Aerosil is added, it is added at this stage at about 0.1 to 1 wt %.
   b. If the product is a granite, chips which may include acrylic, acrylic solid surface, polyester, polycarbonate or similar chips that are added at this stage.
6) The vacuum degas cycle is now started. Degas time varies from about 30 minutes to about 2 hours but about 90 minutes is the average degas time.
7) The Initiator chemicals are now added. The dispersion is ready to pour once the degas cycle is complete.

Pouring to the Machine Head
8) When pouring to the head of the continuous casting machine, the agitator in the dispersion mixing vessel should be turned off.
9) Vacuum is released and a slight amount of pressure (10 psi) is put on the promoter to help the material flow out of the promoter.
10) The dispersion is next pumped through a about 200 to 600 micron canister filter and a 20 flight mixer to the head of the machine using a polytube, preferably a 2-inch polytube.
    a. If a head sock is used, it is added at end of this stage.
11) The dispersion is oscillated at about 1 inch per second and about 6 inches of travel as it pours onto the machine belt.
12) The desired caliper is achieved by shimming the machine, maintaining torque, and maintaining needed speed.
13) The machine typically may run at an average speed of about 70 inches per minute.

The Saw Line
14) Once the product exits the machine, it goes through a quality assurance (QA) inspection which may include color, caliper, contamination, thermostability, etc.).
15) If it passes QA inspection, it is cut and put on a pallet.
16) The pallet is then taken to a pallet flipper and flipped. The top is now the bottom, and the bottom is now the top.

Sanding
17) The sander sands about 5-15 mils from the top and bottom of the sheet.
18) In this example, the sander sands the sheet to a final caliper of 0.472".

What is claimed is:
1. An acrylic composition, comprising:
   about 20-35% acrylic pre-polymerized syrup by weight;
   about 5-20% methyl methacrylate by weight;
   about 5-70% of aluminum trihydrate particulate by weight;
   about 0.5-5% of a micronized pigment by weight, wherein the micronized pigment is selected from the group consisting of carbon black, iron oxide, zinc sulfide, and any combination thereof; and
   a liquid dispersion comprising the micronized pigment and a liquid carrier, wherein the liquid carrier is selected from the group consisting of benzoate ester, butyl acrylate, n-butyl methacrylate, and any combination thereof, wherein the micronized pigment is dispersed in the liquid carrier.
2. The acrylic composition of claim 1, wherein the micronized pigment is about 0.5-1 wt %.
3. The acrylic composition of claim 1, wherein the alumina trihydrate particulate is treated with 3-methacryloxypropyl trimethoxy silane.
4. The acrylic composition of claim 1, wherein the acrylic pre-polymerized syrup is at 20% solids.
5. The acrylic composition of claim 1, wherein the micronized pigment comprises carbon black.
6. A method comprising:
   preparing the acrylic composition of claim 1;
   mixing the acrylic composition such that the micronized pigment bonds to the surface of the aluminum trihydrate particulate;
   combining the mixed acrylic composition with one or more initiators to form a liquid mixture; and
   casting the liquid mixture to form a sheet.
7. The method of claim 6, wherein casting the liquid mixture comprises transferring the liquid mixture to a continuous casting machine.
8. The method of claim 6, wherein preparing the acrylic composition comprises combining the acrylic pre-polymerized syrup, methyl methacrylate, and aluminum trihydrate particulate to form a dispersion; and filtering the dispersion by a 250 to 400 micron filter.
9. The method of claim 6, wherein the aluminum trihydrate particulate is treated with a coupling agent prior to preparing the acrylic composition.
10. The method of claim 6, wherein the micronized pigment is carbon black.
11. The method of claim 6, wherein the micronized pigment is present in an amount of about 0.5-1% by weight of the acrylic composition.

* * * * *